United States Patent
Kern et al.

(10) Patent No.: US 8,868,628 B2
(45) Date of Patent: Oct. 21, 2014

(54) SHARING COMPUTER DATA AMONG COMPUTERS

(75) Inventors: Eric R. Kern, Chapel Hill, NC (US); Shane M. Lardinois, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 679 days.

(21) Appl. No.: 11/312,961

(22) Filed: Dec. 19, 2005

(65) Prior Publication Data

US 2007/0156710 A1 Jul. 5, 2007

(51) Int. Cl.
*G06F 12/00* (2006.01)
*G06F 17/30* (2006.01)

(52) U.S. Cl.
CPC .................. *G06F 17/30067* (2013.01)
USPC ........... 707/831; 707/823; 707/827; 707/828; 709/217; 710/313

(58) Field of Classification Search
None
See application file for complete search history.

(56) References Cited

U.S. PATENT DOCUMENTS

| 5,752,249 A * | 5/1998 | Macon et al. ............. 707/103 R |
|---|---|---|
| 5,991,829 A | 11/1999 | Giorgio et al. |
| 6,192,448 B1 | 2/2001 | Mansur |
| 6,598,131 B2 | 7/2003 | Kedem et al. |
| 6,636,929 B1 | 10/2003 | Frantz et al. |
| 6,857,057 B2 * | 2/2005 | Nelson et al. ................. 711/203 |
| 2002/0078161 A1 | 6/2002 | Cheng |
| 2002/0144024 A1 | 10/2002 | Kumpf et al. |
| 2003/0037184 A1 | 2/2003 | Day et al. |
| 2003/0079055 A1 | 4/2003 | Chen |
| 2003/0120676 A1 | 6/2003 | Holavanahalli et al. |
| 2003/0151885 A1 | 8/2003 | Chang |
| 2004/0254955 A1 * | 12/2004 | Reese et al. ................. 707/104.1 |
| 2005/0091595 A1 * | 4/2005 | Shappell et al. ............. 715/700 |
| 2005/0193160 A1 * | 9/2005 | Bhatt et al. ........................ 711/3 |
| 2006/0259731 A1 * | 11/2006 | Oshins et al. ................. 711/173 |

FOREIGN PATENT DOCUMENTS

| JP | 2002-182858 | 6/2002 |
|---|---|---|
| JP | 2005267599 A | 9/2005 |

OTHER PUBLICATIONS

Fukuda, N., et al., "ONFS: A Shared File System Usable Immediately under Circumstances of Temporary Network," Information Processing Society of Japan, Feb. 15, 2003, pp. 353-63,vol. 44 No. 02, Japan, 2003.

Oike, "Command Super Techniques", (English Abstract/Translation) Linux magazine, Japan, ASCII Corporation, Jun. 1, 2003, vol. 5, 6th issue, pp. 52 to 75.

Ito, "Introduction to PC UNIX for Users of AT-Compatible Machine #22", (English Abstract/Translation) Hello! PC magazine, Japan, SoftBank Corp., Mar. 8, 1998, vol. 5, 4th issue, pp. 224 to 227.

* cited by examiner

*Primary Examiner* — Fred I Ehichioya
*Assistant Examiner* — Jau-Shya Meng
(74) *Attorney, Agent, or Firm* — Edward J. Lenart; Katherine S. Brown; Biggers Kennedy Lenart Spraggins LLP (57) ABSTRACT

Sharing computer data among computers, including identifying by a user through a user interface on a first computer at least one object of a file system to be shared through a second computer; creating by a sharing file system generator on the first computer a sharing file system; installing by the sharing file system generator in the sharing file system the object to be shared; and exposing the object to be shared from the sharing file system to a second computer through a Universal Serial Bus ('USB') connection between the first computer and the second computer.

5 Claims, 7 Drawing Sheets

SHARING COMPUTER DATA AMONG COMPUTERS

BACKGROUND OF THE INVENTION

1. Field of the Invention

The field of the invention is data processing, or, more specifically, methods, apparatus, and products for sharing computer data among computers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas of computer technology that has evolved rapidly is sharing computer data among computers. Technology exits, for example, to allow a computer to remotely mount a diskette drive, a diskette drive image in memory, or a CDROM drive to a server. This technology works well if the files to be shared are files of the same media type as the remotely mounted drive. This technology works reasonably well for mounting drives, but there is presently no useful way of installing a single file, directory, or folder remotely. Moreover, there is presently no useful way of installing a file or directory remotely when the file or directory is of a type different from the remote drive on which it is to be mounted.

SUMMARY OF THE INVENTION

Methods, apparatus, and products are disclosed for sharing computer data among computers that include identifying by a user through a user interface on a first computer at least one object of a file system to be shared through a second computer; creating by a sharing file system generator on the first computer a sharing file system; installing by the sharing file system generator in the sharing file system the object to be shared; and exposing the object to be shared from the sharing file system to a second computer through a Universal Serial Bus ('USB') connection between the first computer and the second computer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
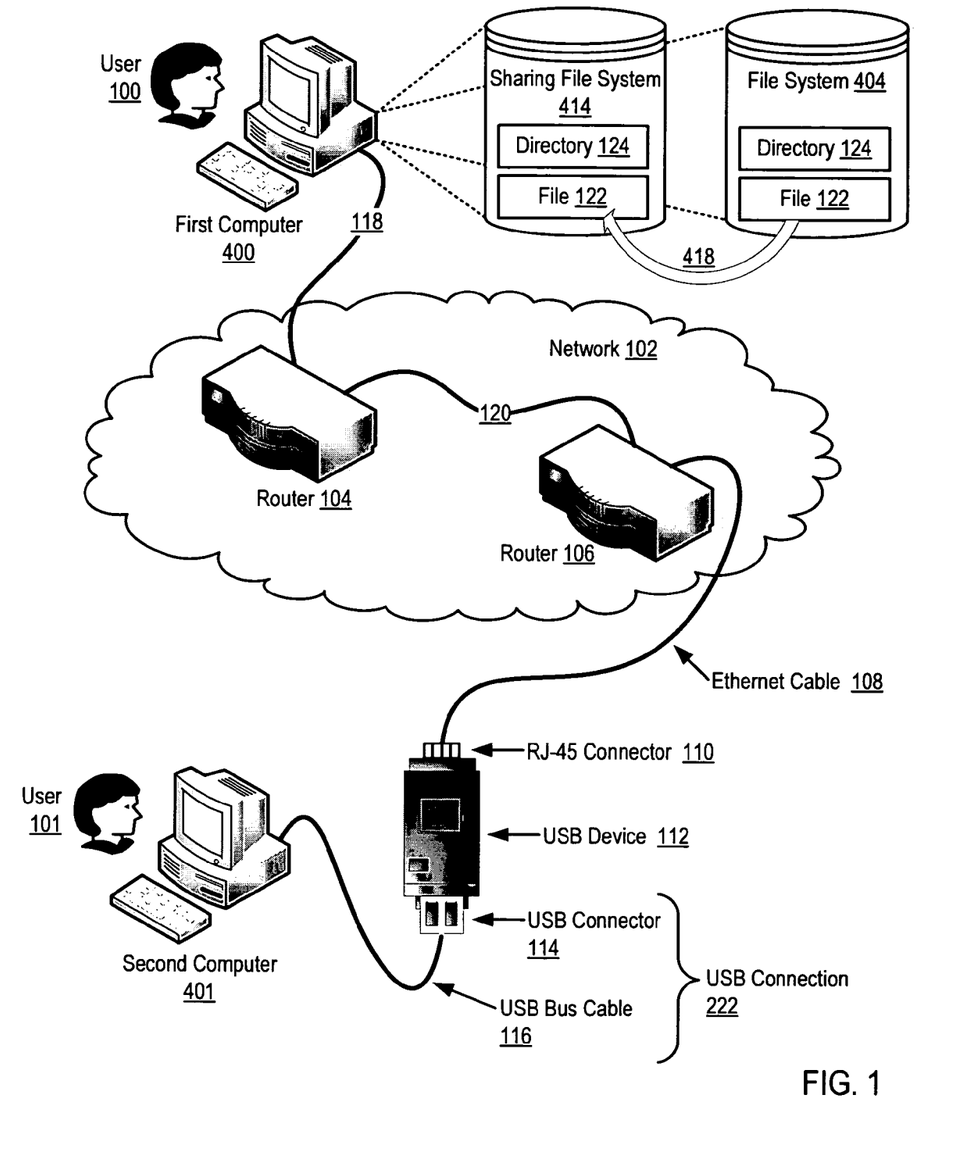
FIG. 1 sets forth a network diagram illustrating an exemplary system for sharing computer data among computers according to embodiments of the present invention.

Exemplary methods, apparatus, and products for sharing computer data among computers according to embodiments of the present invention are described with reference to the accompanying drawings, beginning with FIG. 1. FIG. 1 sets forth a network diagram illustrating an exemplary system for sharing computer data among computers according to embodiments of the present invention. The system of FIG. 1 operates generally to sharing computer data among computers according to embodiments of the present invention by identifying on a first computer (400) at least one object (122, 124) of a file system (404) to be shared through a second computer (401), creating on the first computer a sharing file system (414), installing (418) in the sharing file system (414) the object to be shared, and exposing the object to be shared from the sharing file system to a second computer through a Universal Serial Bus ('USB') connection (222) between the first computer and the second computer. The object to be shared may be any structure of a file system, such as, for example, a file, a directory, a subdirectory, a folder, and so on.

The system of FIG. 1 includes a first computer (400) which is connected to second computer (401) through network (102), USB device (112), and USB connection (222). First computer (400) in this example is a general purpose, programmable computer that includes a file system (404) that contains objects (122, 124) that may be shared among computers according to embodiments of the present invention. First computer (400) also includes a sharing file system (414) in which objects (122, 124) from file system (404) may be installed to be shared among computers according to embodiments of the present invention.

Network (102) is illustrated composed with routers (104, 106). Routers are data communications devices ordinarily viewed as implementing a network layer in a data communications protocol stack, such as, for example, the Internet Protocol ('IP'). Illustrating network (102) with routers, however, is for explanation only, not for limitation of the present invention. As a practical matter, data communications between the first computer and the USB device in systems that share computer data among computers according to embodiments of the present invention may be carried out by any means of data communications that may occur to those of skill in the art including, for example, a wired Ethernet link layer, a wireless link layer, the Transmission Control Protocol ('TCP'), the HyperText Transfer Protocol ('HTTP'), a Public Switched Telephone Network ('PSTN'), a wireless telephone network, and combinations of these and others.

USB Device (112) is a data communications device that complies with the Universal Serial Bus specification as promulgated by the USB Implementers Forum, Inc. The USB Implementers Forum, Inc., is a non-profit corporation founded by the group of companies that developed the Universal Serial Bus specification. The group of companies includes Apple Computer, Hewlett-Packard, NEC, Microsoft, Intel, Agere, Lucent, and Philips. A USB network has an asymmetric design, consisting of a host controller and multiple devices connected in a tree-like fashion from a host controller. There is a limit of to the number of branches per controller in a USB network. A modern computer likely has several host controllers so the total useful number of connected devices is quite large. There is no need for a terminator on any USB bus, as there is for SPI-SCSI and some others. The design of USB is intended to reduce the need for adding separate expansion cards into the computer's ISA or PCI bus, and improve plug-and-play capabilities by allowing devices to be hot swapped or added to the system without rebooting the computer. When a new USB device first plugs in, the host enumerates it and loads a device driver to run it. USB can connect peripherals such as mice, keyboards, gamepads and joysticks, scanners, digital cameras, printers, hard disks, and networking components. For multimedia devices such as scanners and digital cameras, USB has become the standard connection method. For printers, USB has also grown in popularity and started displacing parallel ports because USB makes it simple to add more than one printer to a computer. As of 2004 there were about 1 billion USB devices in the world. As of 2005, the only large classes of peripherals that cannot use USB (because they need a higher data rate than USB can provide) are displays and monitors, and high-quality digital video components.

USB device (112) includes computer hardware and software capable of accepting file system commands through USB connection (222) and forwarding those commands to first computer (400) through network (102). In this way, USB device appears to a user interface or application program on second computer (401) as a disk drive, much as would a traditional flash drive. Second computer is unaware that the disk drive so implemented in fact contains data exposed from first computer through USB connection (222). In typical system for sharing computer data among computers according to embodiments of the present invention, USB device is expected to have a form factor similar to a flash drive, that is, about 1-2 inches in length, an inch or less in width, and less than an inch in thickness.

USB connection (222) in this example includes RJ-45 connector (110). RJ-45 connector (110) is of the type typically used for Ethernet connections (108) to a network (102) for data communications. In systems for sharing computer data among computers according to embodiments of the present invention, RJ-45 connector (110) represents a data communications connection to a first computer (400) from which data representing and comprising objects to be shared are communicated from such a first computer to a second computer through USB connection (222). The use of an RJ-45 connector in this example is only for explanation of data communications between a first computer and a USB device of the present invention; it is not for limitation of the invention. The use of any data communications means between first computer (400) and USB device (112) as will occur to those of skill in the art is well within the scope of the present invention.

USB connection (222) in this example includes a USB connector (114) that connects to second computer (401) through a USB bus cable (116). USB bus cable (116) extends a USB bus from second computer (401) to the USB device (112) through USB connector (114), providing USB power and signal lines from the second computer to the USB device. The USB bus in the second computer connects to a USB host controller in the second computer. The USB architecture so illustrated is not a limitation of the present invention. Alternative USB connections are within the scope of the present invention including, for example, plugging USB connector directly into a USB connector on second computer, connecting USB device to second computer through a larger USB tree network, and other USB connection architectures as will occur to those of skill in the art.

The arrangement of computers and other devices making up the exemplary system illustrated in FIG. 1 are for explanation, not for limitation. Data processing systems useful for sharing computer data among computers according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
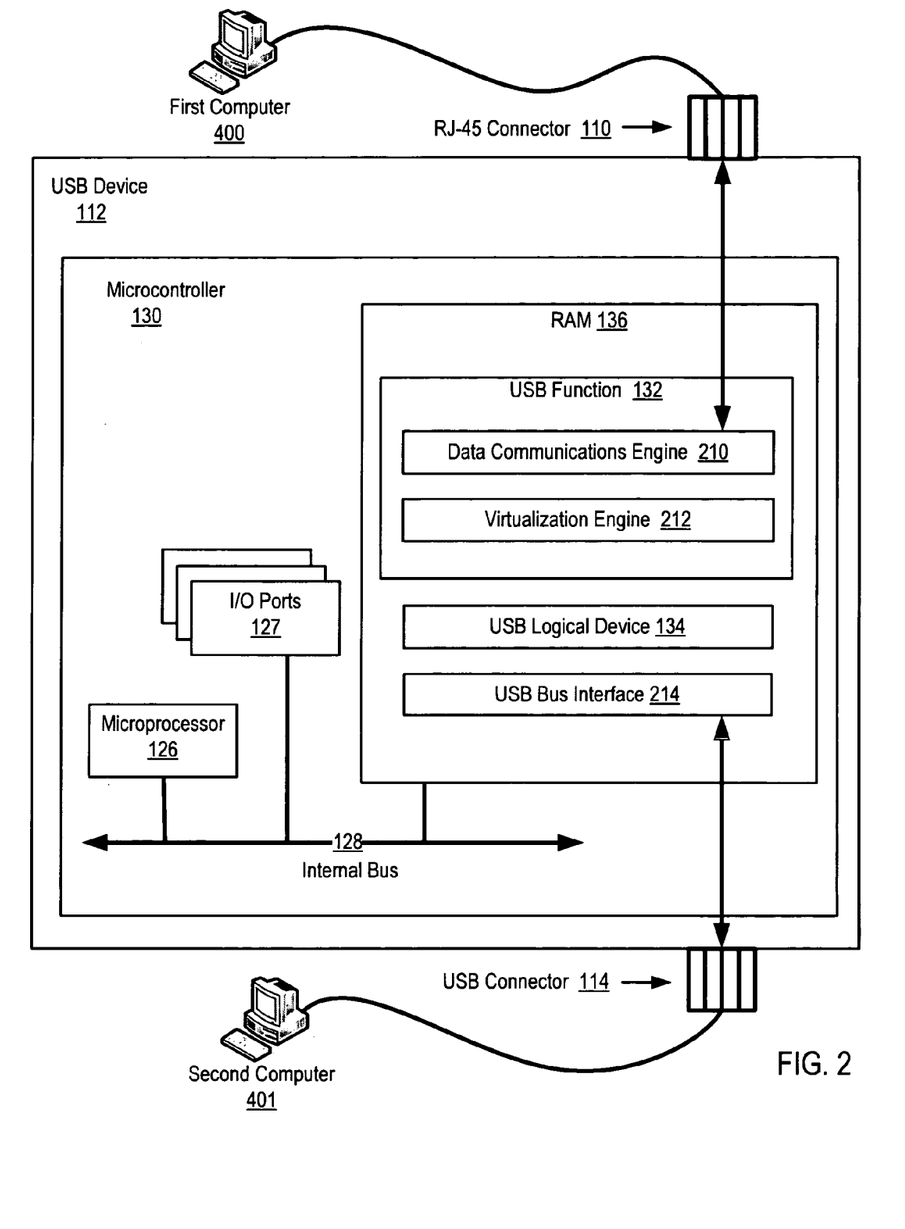
FIG. 2 sets forth a functional block diagram of a USB device adapted for sharing computer data among computers according to embodiments of the present invention.

For further explanation, FIG. 2 sets forth a functional block diagram of a USB device (112) adapted for sharing computer data among computers according to embodiments of the present invention. The USB device of FIG. 2 includes an RJ-45 connector (110), a USB connector (114), and a microcontroller (130). The RJ-45 connector (110) is of the type typically used for Ethernet connections to a network for data communications. In systems for sharing computer data among computers according to embodiments of the present invention, RJ-45 connector (110) represents a connection to a first computer from which data representing and comprising objects to be shared are communicated from such a first computer to a second computer through USB connector (114). USB connector (114) is a standard USB connector according to the USB specification used to share computer data among computers according to embodiments of the present invention by providing a USB connection to a second computer, directly, through a USB bus cable, or through a USB network, for example.

Microcontroller (130) in this example is an embedded system that provides a microprocessor (126), one or more input/output ports (127), and random access memory ('RAM') (136), all coupled for data communications through system bus (128). Microcontroller (130) implements an embedded system in which microprocessor (126) is programmed to carry out sharing computer data among computers according to embodiments of the present invention by computer program instructions stored in RAM (136). Because USB device (112), in the process of sharing computer data among computers, carries out data communications between at least two computers, a first computer and a second computer, microcontroller (130) may usefully be configured with more than one input/output port (127). Power is provided to USB device (112) through USB connector (114) which may be unplugged at any time, removing power from the microcontroller and deleting computer program instructions and other data stored in volatile RAM. RAM (136) therefore, in some embodiments at least, may be usefully implemented as non-volatile memory such as, for example, electrically erasable programmable read only memory (EEPROM or 'flash memory').

Installed in RAM (136) is a USB bus interface (214), a module of computer program instructions that administer USB communications received from and sent to a second computer (401) through USB connector (114). USB bus interface (214) receives serial data through USB connector (114), converts the serial data to parallel, USB framed data, and hands the USB framed data off to USB logical device (134).

USB physical devices provide additional functionality to a host. From the point of view of USB, second computer (401) is a 'host.' The types of functionality provided by USB devices vary widely. However, all USB logical devices, through functionality referred to as a 'logical device,' present the same basic interface to the host. This allows the host to manage the USB-relevant aspects of different USB devices in the same manner. To assist the host in identifying and configuring USB devices, each device carries and reports configuration-related information. Some of the information reported is common among all logical devices. Other information is specific to the functionality provided by the device. USB logical device (134) is a module of computer program instructions that provides the standard USB device functionality according to the USB specification, including for, example:

Dynamic attachment and removal to and from the 'host' or 'second computer.' USB devices may be attached and removed at any time. The hub that provides the attachment point or port is responsible for reporting any change in the state of the port. A USB device is connected to a USB host through a USB 'port' on a USB 'hub.' The host enables the hub port where the device is attached upon detection of an attachment. When a device is removed from a hub port, the hub disables the port where the device was attached and notifies the host of the removal.

Address Assignment. When a USB device is attached, the host is responsible for assigning a unique USB address to the device.

Configuration. A USB device must be configured before its function may be used. The host is responsible for configuring a USB device. The host typically requests configuration information from the USB device to determine the device's capabilities.

Data Transfer. Data may be transferred between a USB device and the host in several ways including, for example, command transfers, isochronous transfers, and bulk transfers.

Power Management. Power management on USB devices includes functions for power budgeting and remote wakeup.

Request Processing. The USB is a polled bus. A host initiates all data transfers. A USB device generally may begin processing a host's requests for data transfers as soon as the device completes setup.

In this example, USB logical device supports sharing computer data among computers by configuring the USB device for bulk transfer and carrying out processing request from the host or second computer (401) with USB bulk transfers, thereby enabling data transfers between a sharing file system on a first computer (400) and a second computer (401).

Also installed in RAM (136) in this example are a virtualization engine (212) and a data communications engine (210) which together constitute a USB 'function' (132) within the meaning of the USB specification. The USB function (132) represents the additional functionality provided by USB device (112) to a host. In this example, the additional functionality so represented is sharing computer data among computers according to embodiments of the present invention. This additional functionality is provided through virtualization engine (212) and data communications engine (210). Virtualization engine (212) is a module of computer program instructions implemented to receive from second computer (401) through USB logical device (134) disk drive commands and other computer data, data to be read from or written to first computer, framed as USB data; extract the disk drive commands and other data from their USB frames; and communicate the disk drive commands and other data to and from first computer (400) through data communications engine (210).

Examples of disk drive commands useful for sharing computer data according to embodiments of the present invention include SCSI (Small Computer System Interface) commands and ATA (Advanced Technology Attachment) commands. SCSI is a standard interface and command set for transferring data between devices on both internal and external computer buses. SCSI is most commonly used for hard disks and tape storage devices, but also connects a wide range of other devices, including scanners, CD-ROM drives, CD recorders, and DVD drives. In fact, the entire SCSI standard promotes device independence, which means that theoretically anything can be made SCSI—SCSI printers have been manufactured. ATA is a standard interface for connecting storage devices such as hard disks and CD-ROM drives in computers. Many terms and synonyms for ATA exist, including abbreviations such as IDE (Integrated Drive Electronics) and UDMA (Ultra Direct Memory Access). An ATA drive interface normally appears as an internal computer storage interface; it provides the most common and the least expensive interface for this application. This specification generally explains sharing computer data among computers in terms of SCSI or ATA, but the use of SCSI or ATA for drive interface is not a limitation of the present invention; sharing computer data among computer according to embodiments of the present invention may be carried out by any drive interface as will occur to those of skill in the art.

Data communications engine (210) is a module of computer program instructions for data communications. Data communications engine (210) may be configured, for example, as a TCP/IP/Ethernet engine that implements the Transmission Control Protocol, the Internet Protocol, and the Ethernet Protocol as the transfer layer, the network layer, and the link layer respectively of a data communications protocol stack. In such an example, data communications engine (210) exposes a TCP interface, such as, for example, a sockets interface, to virtualization engine (212) which issues calls to the TCP interface to establish a data communications connection between USB device (112) and first computer (400). Data communications engine may be preconfigured, even at the time of manufacture, with network addresses and/or port numbers for data communications between USB device (112) and first computer (400). Virtualization engine (212), having extracted disk drive commands or other data from their USB frames received from USB logical device (134), then transmits the commands and transmits or receives data to and from first computer (400) through the TCP connection. As mentioned above, however, the TCP/IP/Ethernet example is for explanation only, and the data communications function between USB device (112) and first computer (400) may be carried out by any data communications means as may occur to those of skill in the art.

Figure 3:
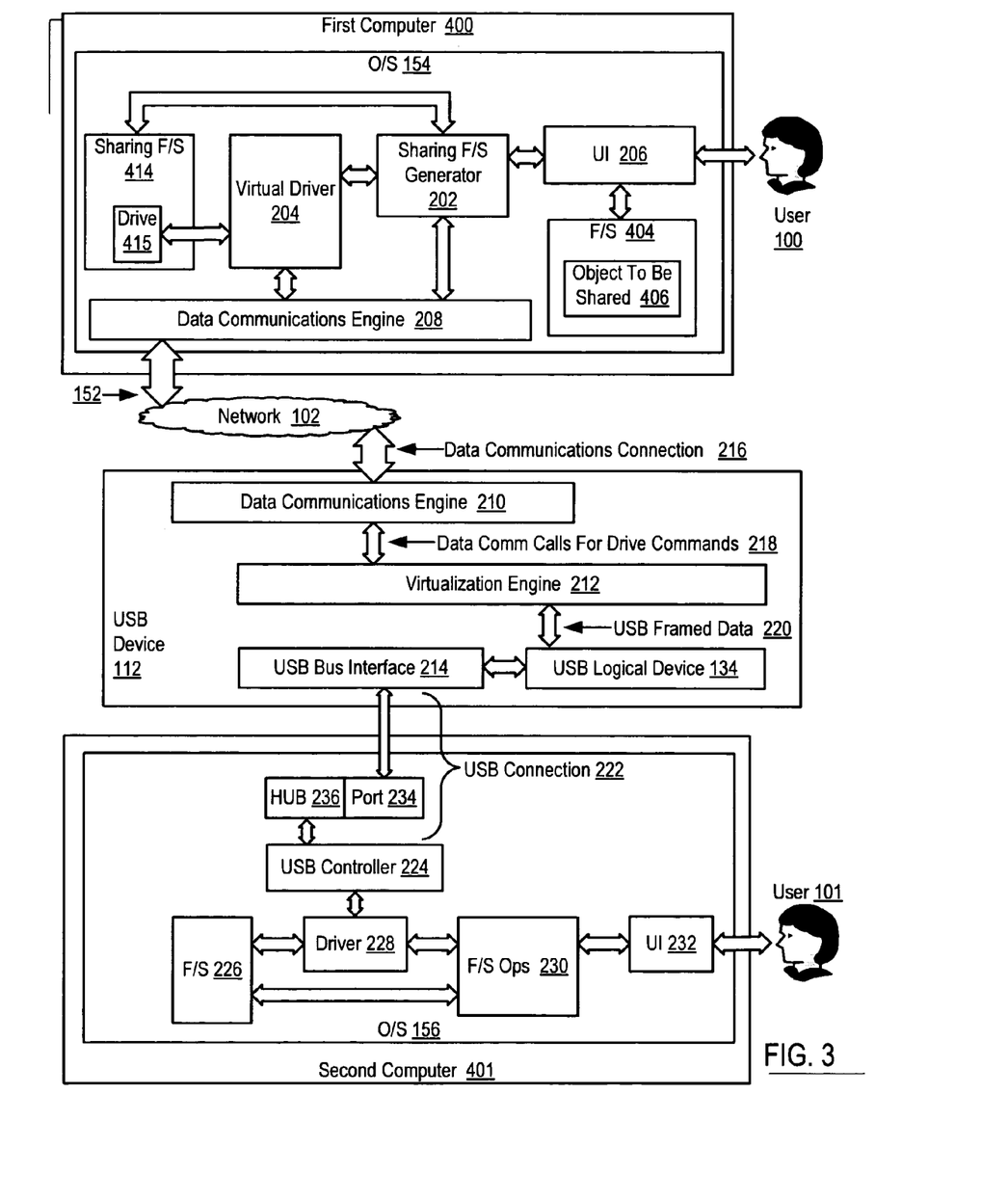
FIG. 3 sets forth a functional block diagram of a system for sharing computer data among computers according to embodiments of the present invention.

For further explanation, FIG. 3 sets forth a functional block diagram of a system for sharing computer data among computers according to embodiments of the present invention. The system of FIG. 3 include a first computer (400) which is connected, for purposes of sharing data, with second computer (401) through network (102), USB device (112), and USB connection (222). Network (102) may be a data communications network of routers that provide data communications among computers by use of data communications protocols as described above with reference to FIG. 1. USB device (112) may be implemented with a microcontroller as an embedded device that provides additional functionality to a host as described above with reference to FIG. 2. USB device (112) includes a data communications engine (210), a virtualization engine (212), a USB logical device (134), and a USB bus interface (214), all of which may be implemented as modules of computer software instructions that operate as described above with reference to FIG. 2.

First computer (400) is a generally programmable computer that includes an operating system (154) that in turn includes a sharing file system (414), a virtual driver (204), a sharing file system generator (202), a user interface (206), a file system (404), and an object to shared (406). Sharing file system (414) includes an emulation of a virtual disk drive (415), implemented, for example, with RAM configured into tracks, sectors, and clusters so as to emulate a disk drive—or implemented in a file opened through file system (404) and configured into tracks, sectors, and cluster so as to emulate a disk drive. The type of drive so emulated may be a SCSI drive, an ATA drive, or a drive of another type as may occur to those of skill in the art. Just as the drive (415) of the sharing file system may be of any type, so the sharing file system itself may emulate any kind of file system as may occur to those of skill in the art, storing in its emulated drive memory data structures representing objects of the sharing file system, typically directories and files. The kind of data structures representing objects of the sharing file system to be stored in the emulated drive of the sharing file system depend upon the kind of file system represented by sharing file system (414). If sharing file system (414) is implemented as a Unix-type system, data structures stored in drive (415) includes a master block and inodes. If sharing file system is implemented as MSDOS, data structures stored in drive (415) include a File Access Table ('FAT') and a Directory Table. And so on, according to the kind of file system implemented by sharing file system (414).

Virtual driver (204) is a virtual disk driver, a module of computer software instructions so called because it drives virtual disk drive (415). If virtual drive (415) is implemented as a SCSI drive, virtual driver (204) is configured as a SCSI driver. If virtual drive (415) is implemented as an ATA drive, virtual driver (204) is configured as an ATA driver. And so on, according to the kind of disk drive emulated by driver (415). Virtual driver (204) is provided at user behest by sharing file system generator (202). Virtual driver (204) accepts disk drive commands to read and write data to and from tracks, sectors, and clusters of drive (415) from file system (404), commands often initiated by a user (100) of first computer (400) through user interface (206), which may be a GUI (Graphical User Interface) or a CLI (Command Line Interface).

In addition, virtual driver (204) is configured to function as a data communications client of data communications engine (208). Data communications engine (210) is a module of computer program instructions for data communications. Data communications engine (208) may be configured in a manner similar to that of data communications engine (210), for example, as a TCP/IP/Ethernet engine that implements the Transmission Control Protocol, the Internet Protocol, and the Ethernet Protocol as the transfer layer, the network layer, and the link layer respectively of a data communications protocol stack. In such an example, data communications engine (208) exposes a TCP interface, such as, for example, a sockets interface, to virtual driver (204) which issues calls to the TCP interface to establish a data communications connection between USB device (112) and first computer (400). Virtual driver (204) then receives disk drive commands and transmits and receives data to and from USB device (112) through the TCP connection. As mentioned above, however, the TCP/IP/Ethernet example is for explanation only, and the data communications function between USB device (112) and first computer (400) may be carried out by any data communications means as may occur to those of skill in the art.

Sharing file system generator (202) is a module of computer program instructions that receive from a user (100) through a user interface (206) on first computer (400) an identification of at least one object (406) of file system (404) to be shared through second computer (401); create on first computer (400) sharing file system (414); and install in sharing file system (414) the object (406) to be shared. Sharing file system generator (202) also functions to expose the object to be shared from the sharing file system to second computer (401) through a Universal Serial Bus ('USB') connection between the first computer and the second computer by transmitting through data communication engine (208) to USB logical device (134) an instruction to attach USB device (112), classified as a USB bulk storage device, to a USB host, second computer (401).

USB devices attach to USB controller (224) through a port (234) on a specialized USB device known as a hub (236). Hubs have status bits that are used to report the attachment or removal of a USB device on one of its ports. The host controller (224) queries the hub to retrieve these bits. In the case of an attachment, the host enables the port and addresses the USB device through the device's control pipe at a default address. The host controller assigns a unique USB address to the USB device and then determines whether the newly attached USB device is a hub or a function. The host establishes its end of the control pipe for the USB device using the assigned USB address and endpoint number zero. If the attached USB device is a hub and USB devices are attached to its ports, then the above procedure is followed for each of the attached USB devices. If the attached USB device is a function, then attachment notifications will be handled by host software that is appropriate for the function.

Upon attachment, configuration data in USB logical device (134) advises USB controller (224) of the type and version of sharing file system (414), whether XT, Unix, i5OS, and so on—and also advises the type of emulated drive (415), whether SCSI, ATA, and so on. USB controller then creates file system (226) to represent on second computer (401) the sharing file system (414) on first computer (400), recording in file system (226) the contents of data structures of sharing file system (414) that represent the object to be share, inode data if sharing file system (414) is a Unix file system, File Access Table data if sharing file system (414) is an MSDOS file system, and so on. Operating system (156) exposes file system (226), which represents on second computer (401) the sharing file system (414) of first computer (400), to application programs through an interface to file system operations (230) and to users through user interface (232).

Sharing file system generator (202) may include computer program instructions that create sharing file system (414) for the object (406) to be shared by determining the size of the object to be shared and setting the size of the sharing file system (414) to a USB flash drive size that is larger than the size of the at least one object to be shared. A USB flash drive is essentially NAND-type flash memory integrated with a USB interface used as a small, lightweight, removable computer data storage device. This hot-swappable, non-volatile, solid-state device is compatible with nearly any computer system that supports USB. USB flash drives are also known as pen drives, thumb drives, USB keys, and a wide variety of other names. A flash drive is made up of a small printed circuit board encased in a robust plastic or metal casing, making the drive sturdy enough to be carried about in a pocket, as a keyfob, or on a lanyard. Only the USB connector protrudes from this protection, and the USB connector is often covered by a removable cap.

When sharing file system generator (202) exposes the object to be shared from the sharing file system to second computer (401) through a Universal Serial Bus ('USB') connection between the first computer and the second computer, sharing file system generator (202) effectively instructs USB logical device (134) to emulate a flash drive when viewed from the perspective of the USB host, second computer (401). That is, sharing file system generator (202) operates in cooperation with virtual driver (204), sharing file system (414), disk drive emulator (415), and the virtualization engine (212), so that USB device (112) appears to second computer (401) to be a flash drive. In particular, USB device (112) appears to provide a flash drive that emulates a file system having a size or maximum capacity that is the same as a standard flash drive size. Standard flash drive sizes are 8, 16, 32, 64, 128, 256, and 512 megabytes, and 1, 2, 4, and 8 gigabytes.

Determining the size of the object to be shared and setting the size of the sharing file system (414) to a USB flash drive size that is larger than the size of the at least one object to be shared may be carried out as follows. If the object to be shared is a file, the size of the object may be read from the data structure of the operating system representing the object, its inode in Unix, its directory table entry in MSDOS, and so on. If the object to be shared is a directory, its size may be taken as the sum of the sizes of any files contained within the directory. If, for example, therefore, a file of size 4 megabytes is the object to be shared, the sharing file system generator (202) in creating the sharing file system (414) may set the size of the sharing file system to the next largest standard USB flash drive size, that is, to 8 megabytes. If the object to be shared is a directory containing files whose combined size is 2.5 gigabytes, the sharing file system generator (202) in creating the sharing file system (414) may set the size of the sharing file system to the next largest standard USB flash drive size, that is, to 4 gigabytes. And so on.

Sharing file system generator's installing the object (406) to be shared in sharing file system (414) is typically carried out by copying the object to be shared from the file system of the first computer to the sharing file system on the first computer, including copying the data comprising the object as well as the contents of the data structures of operating system that represent the object in that file system. There is no requirement that sharing file system (414) be the same kind of file system as file system (404). To the extent that sharing file system (414) is a different kind or version of file system, installing the object to be shared in the sharing file system may include converting its structure. The is, if file system (404) is a Unix-type file system and sharing file system (414) is an MSDOS-type file system, converting the structure of the object to be shared may include converting the data representing the object from entries in Unix inodes to entries in an MSDOS Files Access Table and a Directory Table.

There is no limit on the number of time that a user of a first computer may identify objects to be shared and instruct the sharing file system generator to install the objects for sharing on the sharing file system. It is possible therefore that when a user identifies an additional object to be shared, the additional identified object may be too large to fit in the space presently available for storage on the sharing file system. That is, the size of the additional object added to the size of objects previously installed in the sharing file system may exceed the size of the sharing file system. In such a case, the sharing file system generator (202) may install the additional object in the sharing file system by disconnecting the USB connection (222); increasing the size of the sharing file system (414) on the first computer (400); installing the additional object in the sharing file system; and reconnecting the USB connection (222).

Second computer (401) includes an operating system (156) which in turn includes a file system (226), a USB driver (228), file system operations (230), and a user interface (232). The operating system may be any operating system as may occur to those of skill in the art, MSDOS, Unix, i5OS, AIX, and so on. The file system may be any file system as will occur to those of skill in the art. File system operations are functions exposed to applications and other operating system components for manipulation of objects of a file system, including, for example, functions for creating a file or directory, deleting a file or directory, renaming a file or directory, opening a file, reading data from a file, writing data to a file, changing security permissions for a file or directory, and so on. Some of these file system commands when executed on the second computer affect the object to be shared as installed in the sharing file system on the first computer. USB driver (228) accepts disk drive commands from file system operations that affect the object to be shared as installed in the sharing file system on the first computer, including, for example, instructions to write data to the shared object. USB driver (228) operates by encapsulating such commands in USB data frames and transmitting the USB data frames through USB connection (222) to USB device (112) for further transfer to virtual driver (204) on first computer (400). Virtual driver (204) effects changes in the shared object on sharing file system (414) in accordance with such disk drive commands.

Sharing computer data among computers in accordance with the present invention is generally implemented with computers, that is, with automated computing machinery. In the system of FIG. 1, for example, the network, routers, the USB device, first computer, and second computer, all are implemented to some extent at least as computers. For further explanation, therefore, FIG. 4 sets forth a block diagram of automated computing machinery comprising an exemplary computer (152) of a kind useful in sharing computer data among computers according to embodiments of the present invention. In particular the example of FIG. 4 may be adapted as a first computer or second computer for sharing computer data among computers according to embodiments of the present invention.

Figure 4:
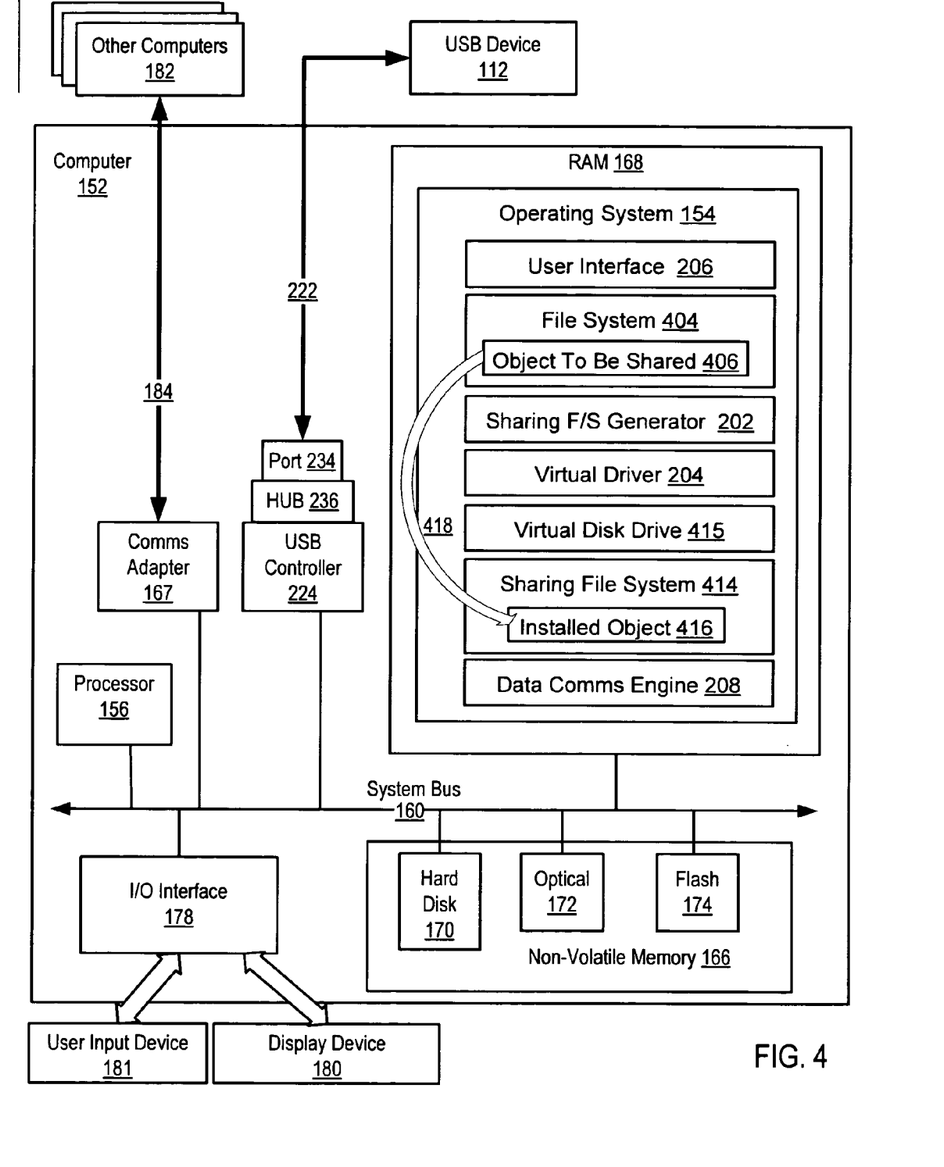
FIG. 4 sets forth a block diagram of automated computing machinery comprising an exemplary computer of a kind useful in sharing computer data among computers according to embodiments of the present invention.

The computer (152) of FIG. 4 includes at least one computer processor (156) or 'CPU' as well as random access memory (168) ('RAM') which is connected through a system bus (160) to processor (156) and to other components of the computer. Stored in RAM (168) is an operating system (154). Operating systems useful in computers according to embodiments of the present invention include UNIX™, Linux™, Microsoft XT™, IBM's AIX™, IBM's i5OS™, and others as will occur to those of skill in the art. Also stored in RAM (168) is a user interface (206), a module of computer program instructions for system control by users. User interface (206) may be a GUI or a CLI. Also stored RAM (168) is a file system (404), a software module containing data structures representing the organization of data on a disk drive into objects such as files and directories. File system (404) also provides functions to manipulate objects of the file systems, including, for example, functions to create and delete files and directories, open and close files and directories, read and write data to and from files and directories, rename files and directories, and so on.

Also stored in RAM (168) is a sharing file system generator (202). Sharing file system generator (202) is a module of computer program instructions that receive from a user through a user interface (206) an identification of at least one object (406) of a file system (404) to be shared through a second computer; create on a first computer a sharing file system (414); and install (418) in the sharing file system (414) the object (416) to be shared. Sharing file system generator (202) also functions to expose the object to be shared from the sharing file system to a second computer through a USB connection between a first computer and a second computer.

Also stored in RAM is a virtual driver (204). Virtual driver (204) is a virtual disk driver, a module of computer software instructions so called because it drives a virtual disk drive (415). In this example, virtual disk drive (415) is illustrated as a RAM drive; readers will recognize, however, that virtual disk drive (415) may be implemented in a file opened through file system (404) and configured into tracks, sectors, and cluster so as to emulate a disk drive. Virtual driver (204) executes disk drive commands to read and write data to and from tracks, sectors, and clusters of virtual disk drive (415). In addition, virtual driver (204) is configured to function as a data communications client of data communications engine (208). Data communications engine (208) is a module of computer program instructions for data communications. Data communications engine (208) may be configured, for example, as a TCP/IP/Ethernet engine. Virtual driver (204) then may receive disk drive commands and transmit and receive data to and from a USB device (112) through a TCP connection effected by use of data communications engine (208).

Operating system (154), user interface (206), file system (404), sharing file system generator (202), virtual driver (204), virtual disk drive (415), sharing file system (414), and data communications engine (208) in the example of FIG. 2 are shown in RAM (168). Readers will recognize, however, that many components of such software typically are stored in non-volatile memory (166) also.

Computer (152) of FIG. 4 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives, or as any other kind of computer memory as will occur to those of skill in the art.

The example computer of FIG. 4 also includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 4 includes a communications adapter (167) for implementing data communications (184) with other computers (182). Such data communications may be carried out serially through RS-232 connections, through external buses such as USB, through data communications networks such as IP/Ethernet networks, and in other ways as will occur to those of skill in the art. Communications adapters implement the hardware level of data communications through which one computer sends data communications to another computer, directly or through a network. Examples of communications adapters useful for sharing computer data among computers according to embodiments of the present invention include modems for wired dial-up communications, Ethernet (IEEE 802.3) adapters for wired network communications, and 802.11b adapters for wireless network communications.

Figure 5:
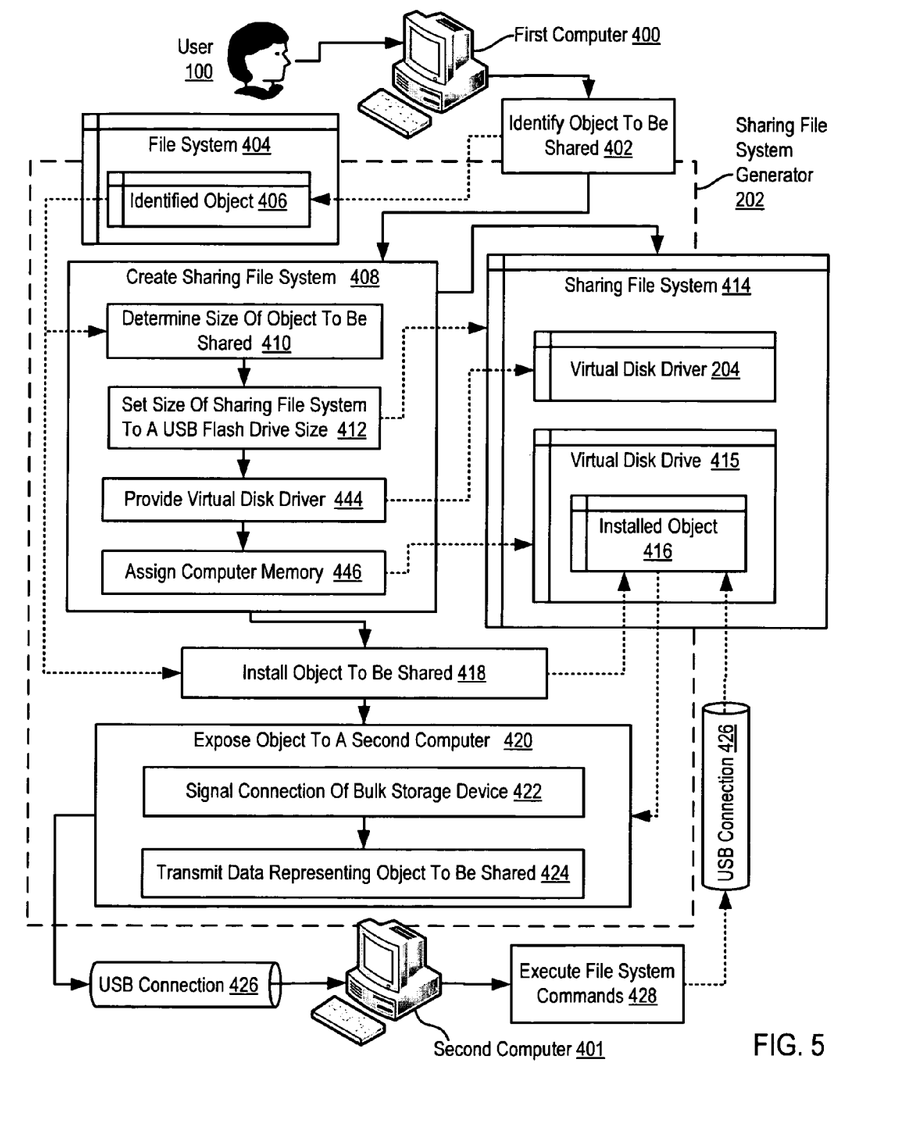
FIG. 5 sets forth a flow chart illustrating an exemplary method for sharing computer data among computers according to embodiments of the present invention.

For further explanation, FIG. 5 sets forth a flow chart illustrating an exemplary method for sharing computer data among computers according to embodiments of the present invention that includes identifying (402) by a user (100) through a user interface on a first computer (400) at least one object (406) of a file system (404) to be shared through a second computer (401). A user may identify an object to be shared by typing an identifying command through a CLI, as, for example:
USBshare c:\myHomeDirectory\myAddressList.doc Such an identifying command invokes a function, named USBshare, in a sharing file system generator (202) of a first computer, which function takes as a parameter the pathname of a file or directory to be shared with a second computer. In this identifying command, the object identified for sharing is a file with the pathname 'c:\myHomeDirectory\myAddressList.doc.' As an alternative to the use of a CLI command, a user may identify an object to be shared by selecting the object with a right mouse-click through a GUI, such as the one illustrated in FIG. 7A.

The method of FIG. 5 also includes creating (408) by a sharing file system generator (202) on the first computer a sharing file system (414). In the method of FIG. 5, creating (408) on the first computer a sharing file system (414) for the object to be shared includes determining (410) the size of the object (406) to be shared and setting (412) the size of the sharing file system (414) to a USB flash drive size that is larger than the size of the at least one object to be shared.

In the method of FIG. 5, creating (408) by a sharing file system generator (202) on the first computer a sharing file system for the object to be shared typically also includes providing (444) a virtual disk driver (204) on the first computer. Such a virtual disk driver typically is provided so as to be accessible on the first computer through an operating system of the first computer, and the virtual disk driver typically is also accessible from the second computer (401) through a USB connection (426).

In the method of FIG. 5, creating (408) by a sharing file system generator (202) on the first computer a sharing file system for the object to be shared typically also includes assigning (446) computer memory to the sharing file system, the computer memory structured to emulate storage of the file system. In this example, assigning (446) computer memory to the sharing file system is carried out by providing a virtual disk drive (415). Virtual disk drive (415) may be implemented, for example, with RAM configured into tracks, sectors, and clusters so as to emulate a disk drive. Or virtual disk drive (415) may be implemented in a file opened through file system (404) and configured into tracks, sectors, and cluster so as to emulate a disk drive of sharing file system (414).

The method of FIG. 5 also includes installing (418) by the sharing file system generator (202) in the sharing file system (414) the object (416) to be shared. In the method of FIG. 5, installing (418) the object to be shared may be carried out by copying the object (406) from file system (404) of the first computer to the sharing file system (414), also on the first computer. The method includes converting the structure of the object to be shared if the sharing file system (414) is of a type different from the file system (404) from which the object is copied.

The method of FIG. 5 also includes exposing (420) the object (416) to be shared from the sharing file system (414) to a second computer (401) through a Universal Serial Bus ('USB') connection (426) between the first computer and the second computer. In the method of FIG. 5, exposing (420) the object (416) to be shared from the sharing file system to a second computer through a USB connection typically includes signaling (422) the second computer through a USB interface to connect a USB bulk storage device.

In the method of FIG. 5, exposing (420) the object to be shared from the sharing file system to a second computer through a USB connection also includes transmitting (424), from a data communication module on the first computer through a network to a data communication module on the second computer, at least data of the sharing file system representing the object to be shared. This is useful because the second computer, or at least a USB controller on the second computer, will cause an operating system of the second computer to create a file system on the second computer to represent the sharing file system on the first computer, thereby emulating a USB flash drive. The second computer may or may not ever actually read or write data to or from the shared object. The operating system of the second computer typically will, however, make the object available for manipulation by users and by application programs by reference to the file name or directory name and other characteristics of the object. The operating system on the second computer therefore needs access to such information, access to a File Access Table and a Directory Table if the sharing file system is an MSDOS-type file system, access to inode data if the sharing file system is a Unix-type file system, and so on. Such information is stored in predefined tracks and sectors of virtual disk drive (415), and it is this information that is transmitted as at least data of the sharing file system representing the object to be shared.

The method of FIG. 5 also includes executing (428) file system commands on the second computer (401) that affect the object (416) to be shared as installed in the sharing file system (414) on the first computer (400). Sharing file system (414) now appears to users and application programs on second computer (401) as a file system on second computer (401), a disk drive, one or more directories or folders, one or more files, and so on. Files and directories of sharing file system may therefore be manipulated by application programs, users, and by elements of an operating system on second computer just as though they were files and directories actually stored on second computer itself. These are a characteristics sometimes referred to as a virtual file system—that the sharing file system (414) on first computer (402) now appears to users and applications of second computer (401) as a file system of second computer (401). Because the File Access Table, Directory Table, inodes, and other data structures representing shared objects are installed as components of an operating system on second computer, file system operations such as opening a shared file, closing a shared file, and the like, do not affect the object to be shared—do not affect the contents of the object as installed for sharing in the sharing file system. Commands that write data to the object, however, do affect the object to be shared as installed in the sharing file system on the first computer—because such commands change the actual data content of the object itself rather than merely affecting the content of data structures representing or describing the object.

Figure 6:
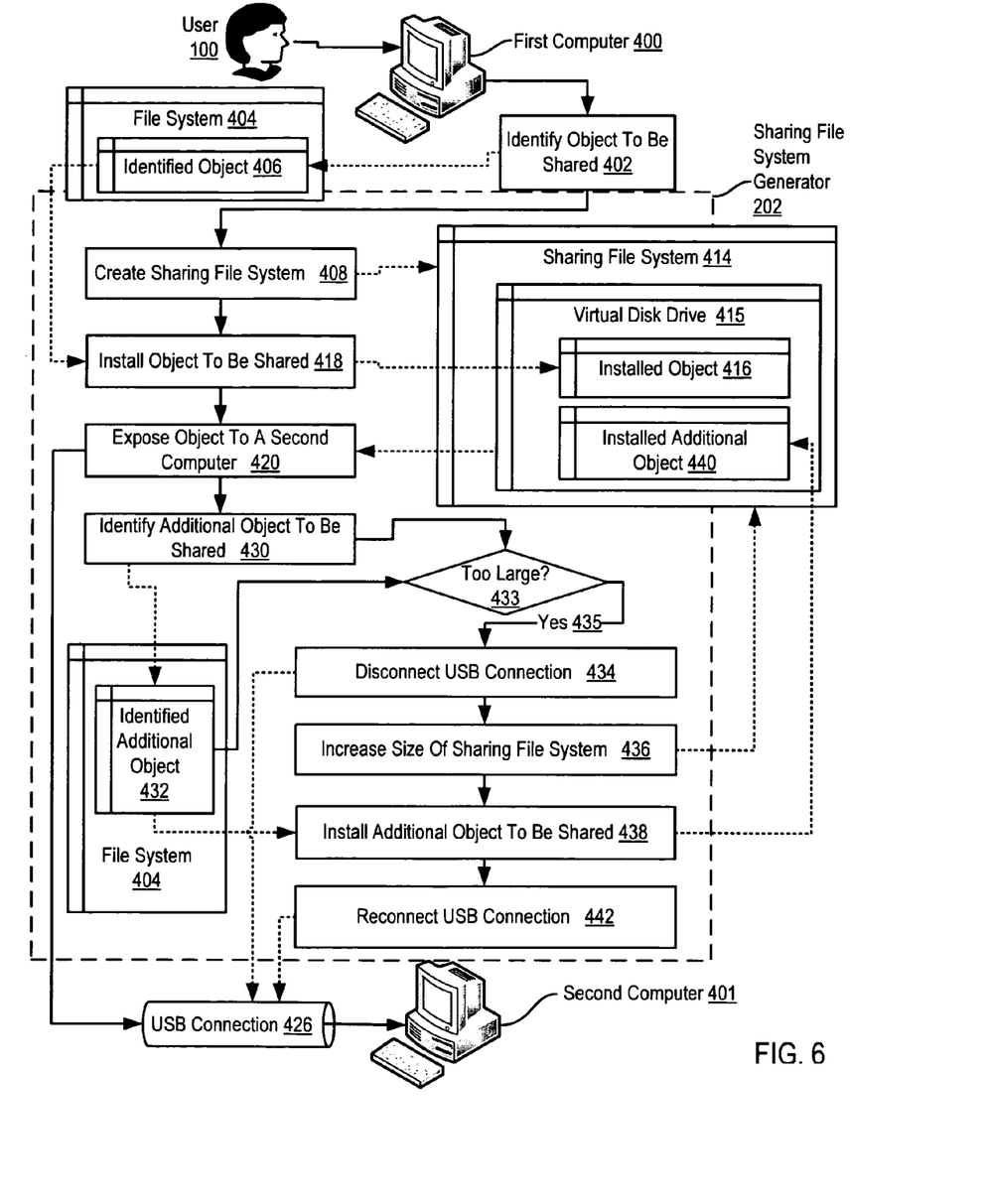
FIG. 6 sets forth a flow chart illustrating a further exemplary method for sharing computer data among computers according to embodiments of the present invention.

For further explanation, FIG. 6 sets forth a flow chart illustrating a further exemplary method for sharing computer data among computers according to embodiments of the present invention. The method of FIG. 6 is similar to the method of FIG. 5. The method of FIG. 6 includes identifying (402) an object (406) to be shared, creating (408) a sharing file system (414), installing (418) the object (416) to be shared in the sharing file system, and exposing (420) the object (416) to be shared to a second computer through a USB connection (426), all steps of the method of FIG. 6 that operate as described above for the method of FIG. 5.

The method of FIG. 6, however, also includes identifying (430) by a user (100) on the first computer (400) at least one additional object (432) to be shared with the second computer. A user may identify an additional object to be shared by typing an identifying command through a CLI, as, for example:
USBshare c:\myHomeDirectory\additionalFile.doc Such an identifying command invokes a function, named USBshare, in a sharing file system generator (202) of a first computer, which function takes as a parameter the pathname of an additional file or directory to be shared with a second computer. In this identifying command, the additional object (432) identified for sharing is a file with the pathname 'c:\myHomeDirectory\additionalFile.doc.' As an alternative to the use of a CLI command, a user may identify an additional object to be shared by selecting the object with a right mouseclick through a GUI, such as the one illustrated in FIG. 7A.

In the method of FIG. 6, the size of the additional object (432) added to the size of objects (416) previously installed in the sharing file system exceeds the size of the sharing file system. That is, the additional object (432) is too large (433, 435) to fit into the storage space presently remaining in the sharing file system. Because the additional object is presently too large for the sharing file system, the method of FIG. 6 also includes disconnecting (434) the USB connection (426), increasing (436) the size of the sharing file system on the first computer, installing (438) the additional object (440) in the sharing file system (414), and reconnecting (442) the USB connection (426) between the first computer and the second computer—as described in more detail below.

In support of resizing its sharing file system (414), the method of FIG. 6 includes disconnecting (434) by the sharing file system generator (202) the USB connection (426). As described above, a USB device is connected to a USB host through a USB 'port' on a USB 'hub.' The USB host, in this example, second computer (401), enables the hub port where the device is attached upon detection of an attachment. When a device is removed from a hub port, the hub disables the port where the device was attached and notifies the host of the removal. Sharing file system generator (202) disconnects (434) USB connection (426) by transmitting through a data communication engine (e.g., 208 on FIG. 3) to a USB logical device (134 on FIG. 3) an instruction to detach USB device (112 on FIG. 3) from the USB port (234 on FIG. 3) through which it is connected to the second computer. USB devices attach to a USB controller (224 on FIG. 3) through a port (234 on FIG. 3) on a specialized USB device known as a hub (236 on FIG. 3). Hubs have status bits that are used to report the attachment or removal of a USB device on one of its ports. The host controller (224 on FIG. 3) queries the hub to retrieve these bits. In the case of an detachment, the host disables the port, and reports the detachment to its USB controller.

The method of FIG. 6 also includes increasing (436) by the sharing file system generator (202) the size of the sharing file system on the first computer. In this example, the size of the sharing file system is the amount of memory allocated as RAM or disk space to virtual disk dive (415). Increasing the size of the sharing file system therefore is carried out by allocating more memory, RAM or disk space, to virtual disk drive (415). To support emulation of a USB flash drive, increasing the size of the sharing file system typically includes setting the new size of the sharing file system to a standard USB flash drive size. Standard flash drive sizes are 8, 16, 32, 64, 128, 256, and 512 megabytes, and 1, 2, 4, and 8 gigabytes. If the size of the additional object (432) added to the total size of objects previously installed in the sharing file system is 60 megabytes, for example, increasing the size of the sharing file system may be carried out by increasing the size of the sharing file system to 64 megabytes. If the size of the additional object added to the total size of objects previously installed in the sharing file system is 600 megabytes, for example, increasing the size of the sharing file system may be carried out by increasing the size of the sharing file system to 1 gigabyte. And so on.

The method of FIG. 6 also includes installing (438) by the sharing file system generator (202) the additional object (432, 440) in the sharing file system (414). Installing (438) the additional object to be shared in sharing file system (414) may be carried out by copying the additional object from the file system (404) of the first computer to the sharing file system (414) on the first computer, including copying the data comprising the additional object as well as the contents of the data structures of file system (404) that represent the additional object (432) in that file system. There is no requirement that sharing file system (414) be the same kind of file system as file system (404). To the extent that the sharing file system is a different kind or version of file system, installing the object to be shared in the sharing file system may include converting its structure. If, for example, file system (404) is a Unix-type file system and sharing file system (414) is an MSDOS-type file system, converting the structure of the object to be shared may include converting the data representing the object from entries in Unix inodes to entries in an MSDOS File Access Table and a Directory Table.

The method of FIG. 6 also includes reconnecting (442) the USB connection (426) between the first computer and the second computer. Sharing file system generator (202) may reconnect the USB connection between the first computer and the second computer by transmitting to a USB logical device (134 on FIG. 3) an instruction to attach a USB device (112 on FIG. 3) to second computer (401). Upon attachment, configuration data in the USB logical device advises a USB controller (224 on FIG. 3) in second computer (401) of the type, version, and size of sharing file system (414). The size of sharing file system so advised is the new size just established, in this example, a standard USB flash drive size.

Figure 7A:
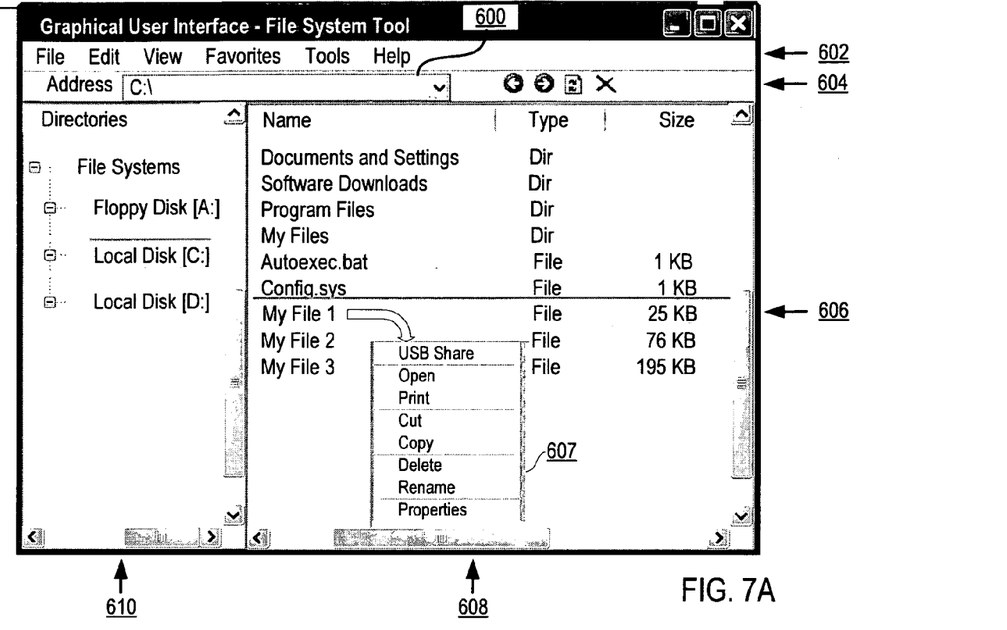
FIG. 7A sets forth a line drawing of an exemplary graphical user interface comprising a file system tool for navigating among and manipulating objects of a file system.

FIG. 7A sets forth a line drawing of an exemplary graphical user interface comprising a file system tool for navigating among and manipulating objects of a file system, in this example, files and directories. A well known example of such a tool that may be improved for sharing computer data among computers according to embodiments of the present invention is Microsoft's Windows Explorer™. The file system tool of FIG. 7A includes a horizontal menu (602) that includes menu items representing file system commands including menu items named File, Edit, View, Favorites, Tools, and Help. The file system tool of FIG. 7A includes a toolbar (604) bearing icons for a Back function, a Forward function, a Refresh function, and a Delete function. The toolbar (604) also includes an address box (600) to aid navigation among files and directories of a file system. The file system tool of FIG. 7A includes a text box (610) in which is displayed a list of file systems, Floppy Disk [A:], Local Disk [C:], The file system tool of FIG. 7A has been navigated to point to the root directory of the C: drive, Local Disk [C:], so indicated by the presence of "C:\" in address box (600) and by the highlighting of "Local Disk [C:]" The file system tool of FIG. 7A includes a text box (608) in which is displayed a list of subdirectories and files in the root directory of the C: drive.

In the list of files in the root directory of the C: drive, a file (606) named "My File 1" is highlighted as selected. My File 1 has experience a right mouseclick which caused display of a popup menu (607) whose entries represent file system command typically useful with respect to a file, Open, Print, Cut, Copy, Delete, Rename, and so on. Popup menu (607) also includes an entry named "USB Share." Invoking USB Share with a mouseclick while My File 1 is selected identifies My File 1 to a sharing file system generator as a file to be shared. The sharing file system generator then shares the file according to embodiments of the present invention by creating on a first computer (that is, the computer on which the file system tool is running) a sharing file system, installing in the sharing file system a copy of My File 1, and exposing My File 1 to be shared from the sharing file system to a second computer through a USB connection between the first computer and the second computer.

Figure 7B:
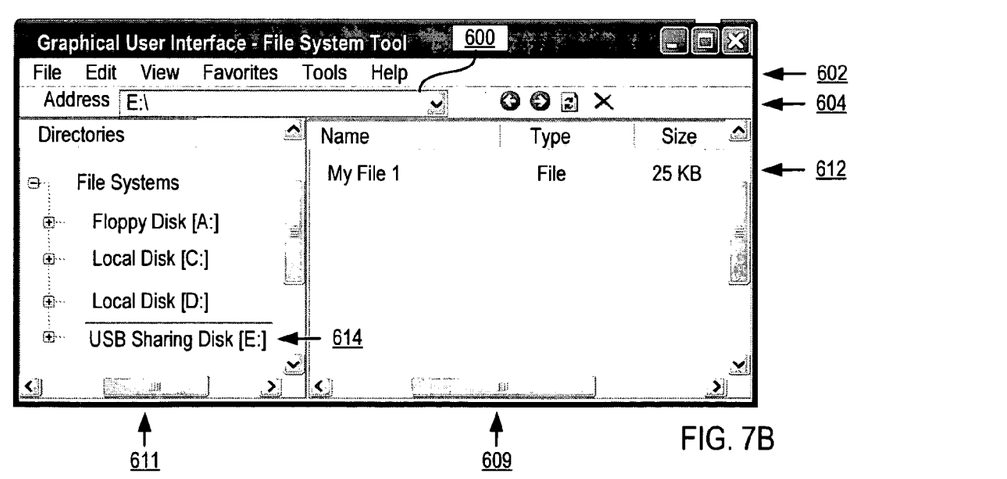
FIG. 7B sets forth a line drawing of a further exemplary graphical user interface comprising a file system tool for navigating among and manipulating objects of a file system.

FIG. 7B sets forth a line drawing of a further exemplary graphical user interface comprising a file system tool for navigating among and manipulating objects of a file system, in this example, files and directories. The file system tool of FIG. 7B is very similar to the file system tool of FIG. 7A described above, having also a horizontal menu (602) of file system commands, a toolbar (604), and an address box (600). The file system tool of FIG. 7B, however, is installed and running on a second computer, a computer with which the file named "My File 1" has been shared according to embodiments of the present invention from the computer on which the file system tool of FIG. 7A is running. Text box (611) with "USB Sharing Disk [E:]" (614) highlighted and address box (600) displaying "E:\" show the file system tool of FIG. 7B navigated to point to the root directory of its E: drive. Text box (609) shows the root directory of the E: drive to contain a single file (612) named "My File 1." In this example, the E: drive is a file system created by an operating system of the second computer in response to attachment to the second computer of a USB Bulk Storage Device improved according to embodiments of the present invention to include a virtualization engine configured to communicate disk drive commands between the computer on which the file system tool of FIG. 7B is running (the 'first computer') and the computer on which the file system tool of FIG. 7A is running (the 'second computer'). From the point of view of the second computer, the E: drive appears as a standard USB flash drive, and My File 1 appears as a standard object of a file system of the second computer, residing in a directory on a USB flash drive. A user of the second computer may now open, edit, save changes to, print, or delete My File 1 just as though My File 1 were resident on the second computer.

Exemplary embodiments of the present invention are described largely in the context of a fully functional computer system for sharing computer data among computers. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for sharing computer data among computers, the method comprising:
   identifying by a user through a user interface on a first computer at least one object of a file system to be shared through a second computer, wherein the sharing file system is a distinct file system from the file system;
   creating by a sharing file system generator on the first computer a sharing file system in the first computer, including providing a virtual disk driver on the first computer to accept file system commands for the sharing file system, the virtual disk driver accessible on the first computer through an operating system of the first computer, the virtual disk driver also accessible from the second computer through a Universal Serial Bus (USB) connection connecting the second computer to a USB device, and a data communications engine connecting the USB device to the first computer over a network;
   installing, by the sharing file system generator in the sharing file system, the object to be shared, wherein installing the object to be shared includes copying the object to be shared from the file system of the first computer to the sharing file system of the first computer by copying data comprising the object and contents of data structures of an operating system that represents the object in the file system including converting the data structure of the object to be shared from a first type corresponding to the file system to a second type corresponding to the sharing file system; and
   exposing the object to be shared from the sharing file system to the second computer through the USB device connection between the first computer and the second computer, wherein objects in the file system that are not the object to be shared are not visible to the second computer.

2. The method of claim 1 further comprising executing file system commands on the second computer that affect the object to be shared as installed in the sharing file system on the first computer.

3. The method of claim 1 wherein creating on the first computer a sharing file system for the object to be shared further comprises:
   determining a size of the at least one object to be shared; and
   setting a size of the sharing file system to a USB flash drive size that is larger than the size of the at least one object to be shared.

4. The method of claim 1 wherein creating by a sharing file system generator on the first computer a sharing file system for the object to be shared further comprises assigning computer memory to the sharing file system, the computer memory structured to emulate storage of the file system.

5. The method of claim 1 further comprising:
   identifying by a user on the first computer at least one additional object to be shared with the second computer, wherein a size of the additional object added to a size of objects previously installed in the sharing file system exceeds a size of the sharing file system;
   disconnecting by the sharing file system generator the USB connection;
   increasing by the sharing file system generator the size of the sharing file system on the first computer;
   installing by the sharing file system generator the additional object in the sharing file system; and
   reconnecting the USB connection.

* * * * *